United States Patent
Rados (10) Patent No.: US 9,256,615 B2
(45) Date of Patent: Feb. 9, 2016

(54) PERSONALIZED NAVIGATION INFORMATION BASED ON USER BEHAVIOR

(71) Applicant: Verizon Patent and Licensing Inc., Arlington, VA (US)

(72) Inventor: Steven R. Rados, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 249 days.

(21) Appl. No.: 13/796,916

(22) Filed: Mar. 12, 2013

(65) Prior Publication Data
US 2014/0274107 A1 Sep. 18, 2014

(51) Int. Cl.
| | |
|---|---|
| *G06F 3/048* | (2013.01) |
| *G06F 17/30* | (2006.01) |
| *G06F 9/44* | (2006.01) |
| *G05B 19/042* | (2006.01) |
| *G01C 21/36* | (2006.01) |

(52) U.S. Cl.
CPC ...... *G06F 17/30241* (2013.01); *G01C 21/3617* (2013.01); *G01C 21/3682* (2013.01); *G05B 19/0426* (2013.01); *G06F 8/34* (2013.01)

(58) Field of Classification Search
CPC .. G06F 8/34; G06F 17/30241; G05B 19/0426
USPC ................................................. 715/816, 771
See application file for complete search history.

(56) References Cited

U.S. PATENT DOCUMENTS

| | | | | |
|---|---|---|---|---|
| 8,082,094 | B2* | 12/2011 | Gao | 701/446 |
| 8,296,373 | B2* | 10/2012 | Bosworth | G06Q 10/10 709/206 |
| 8,335,493 | B2* | 12/2012 | Angelhag | H04L 67/16 455/41.1 |
| 8,494,560 | B2* | 7/2013 | Parker | 455/456.3 |
| 8,548,735 | B2* | 10/2013 | Forstall et al. | 701/412 |
| 8,605,141 | B2* | 12/2013 | Dialameh et al. | 348/62 |
| 8,644,843 | B2* | 2/2014 | Canon et al. | 455/456.1 |
| 8,694,026 | B2* | 4/2014 | Forstall et al. | 455/456.3 |
| 8,762,056 | B2* | 6/2014 | Forstall et al. | 701/519 |
| 8,768,379 | B2* | 7/2014 | Busch | 455/456.1 |
| 8,774,825 | B2* | 7/2014 | Forstall et al. | 455/456.1 |
| 8,892,126 | B2* | 11/2014 | Busch | 455/456.1 |
| 8,903,593 | B1* | 12/2014 | Addepalli | H04W 4/046 701/29.1 |
| 2008/0040678 | A1* | 2/2008 | Crump | 715/763 |
| 2009/0005021 | A1* | 1/2009 | Forstall et al. | 455/414.3 |
| 2010/0325563 | A1* | 12/2010 | Goldthwaite et al. | 715/757 |
| 2014/0222512 | A1* | 8/2014 | Pace | 705/7.32 |

* cited by examiner

*Primary Examiner* — David Phantana Angkool (57) ABSTRACT

A user device may be configured to receive information regarding a set of points of interest that have been determined based on behavior information associated with a user of the user device. The information regarding the set of points of interest may indicate geographical locations associated with one or more of the points of interest, of the set of points of interest. The user device may determine a present geographical location associated with the user device; compare the geographical locations associated with the one or more points of interest to the present geographical location associated with the user device; identify, based on the comparing, a particular point of interest, of the set of points of interest, that is within a particular distance of the present geographical location of the user device; and output, via a display device, information regarding the identified particular point of interest.

22 Claims, 12 Drawing Sheets

PERSONALIZED NAVIGATION INFORMATION BASED ON USER BEHAVIOR

BACKGROUND

Navigation devices, such as those that are present in automobiles, may be used to aid users in locating destinations that are of interest to the users. Some such navigation devices may include a display, upon which a map may be displayed. The map may, in some situations, include icons that denote the location of, for example, businesses (e.g., restaurants, gas stations, airports, etc.) or other landmarks.

BRIEF DESCRIPTION OF THE DRAWINGS

FIGS. 1A-3B illustrate overviews of one or more example implementations described herein;

DETAILED DESCRIPTION OF PREFERRED EMBODIMENTS

The following detailed description refers to the accompanying drawings. The same reference numbers in different drawings may identify the same or similar elements.

Techniques described herein may allow for personalized navigation information to be presented to users. In some implementations, the personalized navigation information may be generated based on user analytics (e.g., based on user behavior and/or based on information provided by users). The personalized navigation information may be displayed by navigation devices, such as navigation systems that are present in automobiles, navigation-enabled personal wireless telephones, etc. The personalized navigation information may take various forms, in various implementations. For example, as shown in FIGS. 1A-3B, the personalized navigation information may include map overlay icons that correspond to locations of points of interest ("POIs") that may be relevant to the user, pop-up notifications of nearby relevant POIs, modifications of driving routes, and/or other types of information. Identifying POIs that may be relevant to users may enhance the experience of users, as users may be provided with enhanced navigation information regarding the POIs.

Figure 1A:
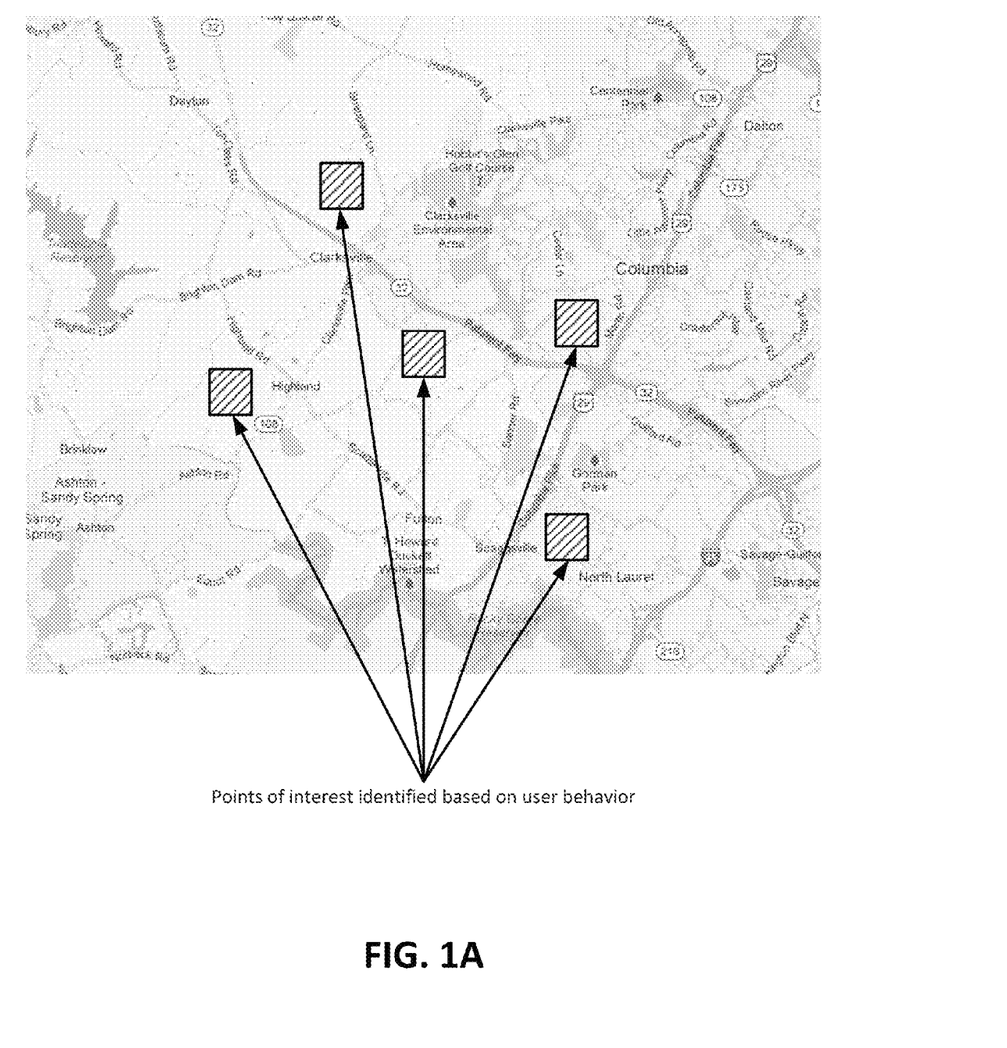

FIG. 1A illustrates an example map, which may be displayed by a navigation device associated with a user. As shown, the map may include a set of overlaid icons that correspond to POIs that have been identified based on user behavior, such as by identifying businesses that have been frequently visited by the user, and/or based on information provided by the user.

Figure 1B:
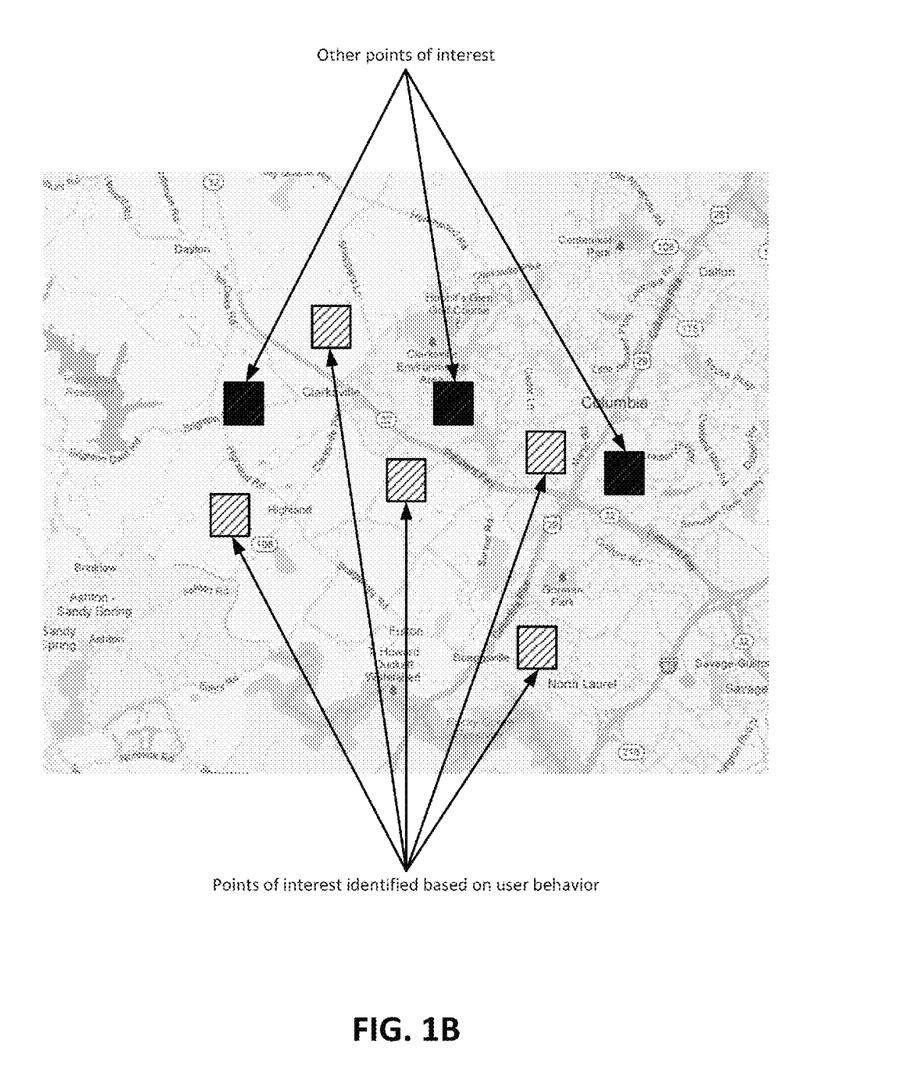

FIG. 1B illustrates another example map, which may include a first set of overlaid icons that correspond to POIs that have been identified based on user behavior, and a second set of overlaid icons that correspond to other POIs. For example, the other POIs may include POIs that have not been identified based on user behavior. For example, this second set of overlaid icons may be displayed based on a user preference to manually display icons associated with POIs (e.g., a user may have selected a setting via which gas stations are denoted on the map by overlaid icons). As shown, the second set of overlaid icons may be displayed in a different fashion (e.g., a different color or shading) than the icons of first set.

Figure 2A:
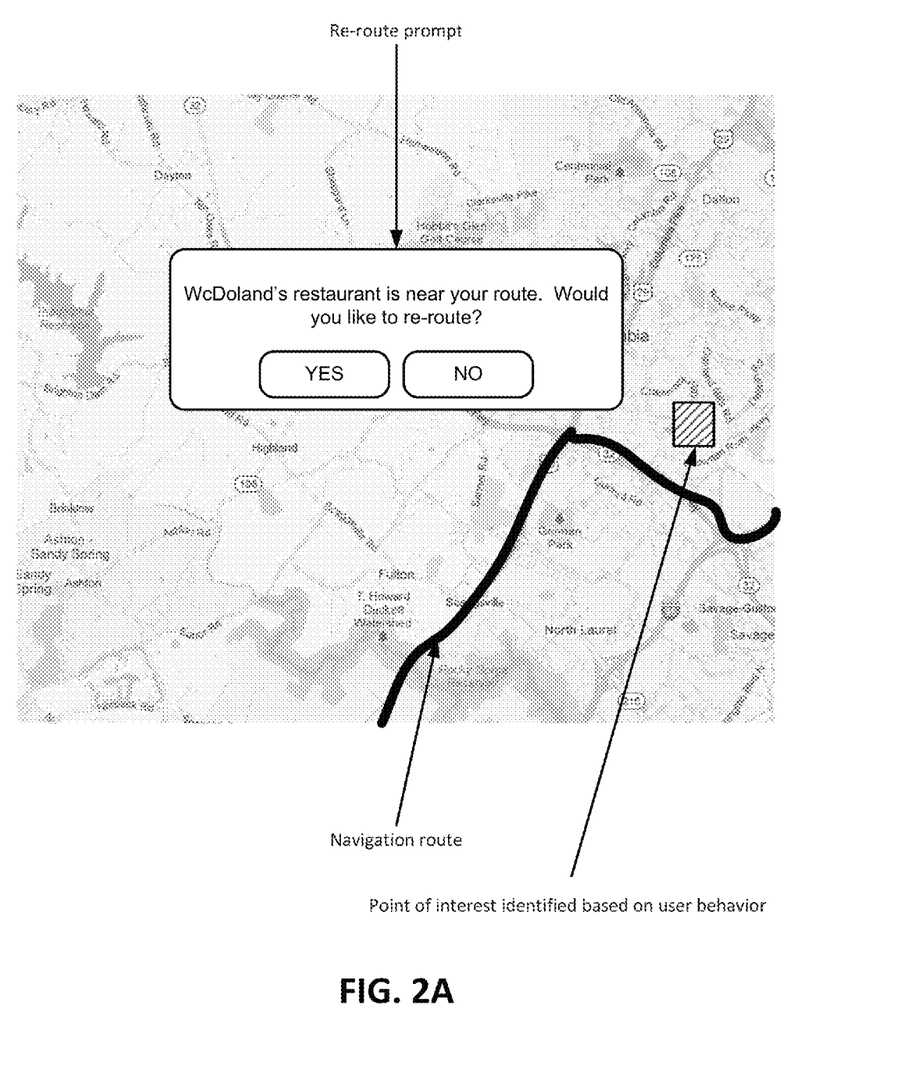
Figure 2B:
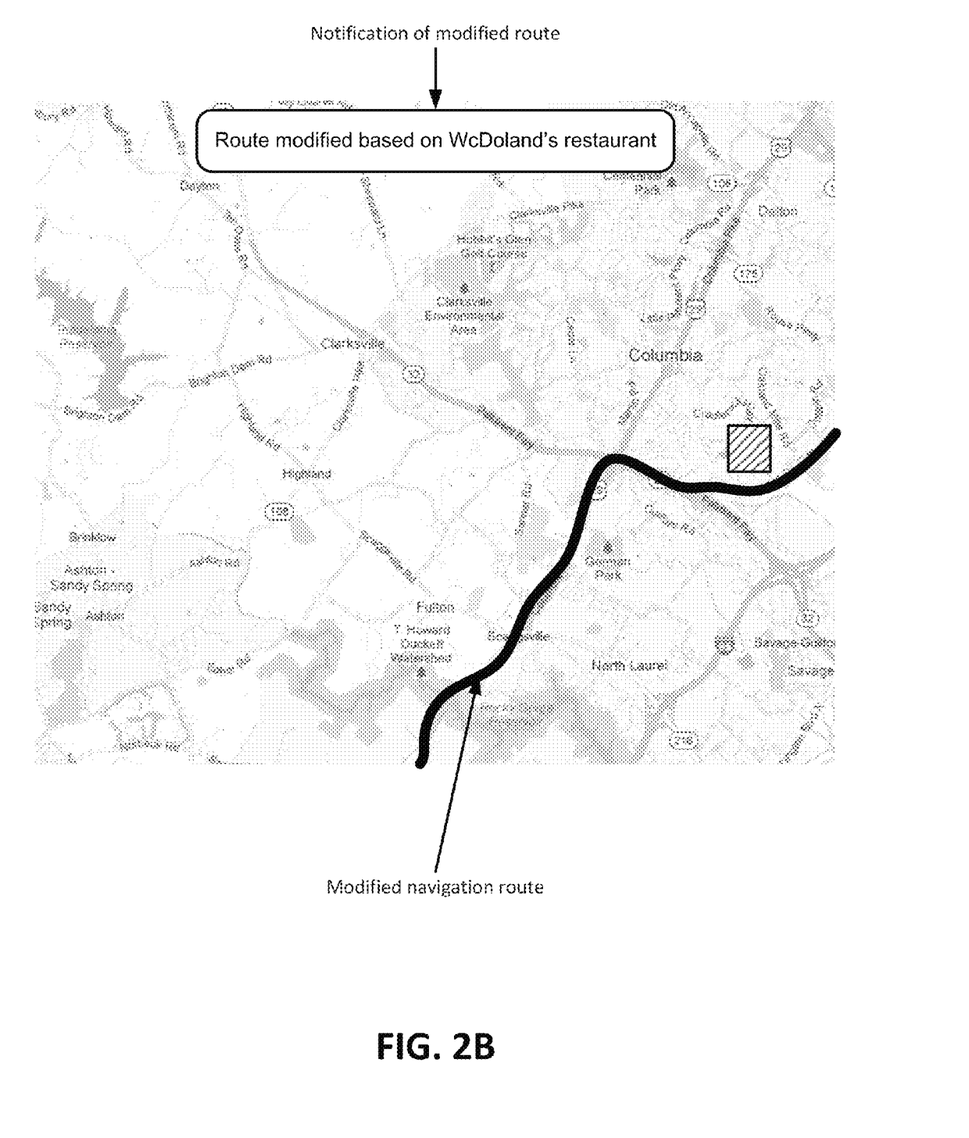

FIGS. 2A and 2B illustrate an example of modifying a navigation route, based on a nearby POI that has been identified as being relevant to a user. For instance, FIG. 2A illustrates a map with an overlaid navigation route, which may correspond to a route from a starting point to an ending point, selected by the user. In some implementations, it may be determined that the POI is near the route, and a prompt may be presented to the user, asking if the user wishes to modify the route (e.g., if the user wishes to be routed to the POI before being routed to the original destination). FIG. 2B illustrates an example of a modification to the route shown in FIG. 2A, in the case where the user selects the option to modify the route.

Figure 3A:
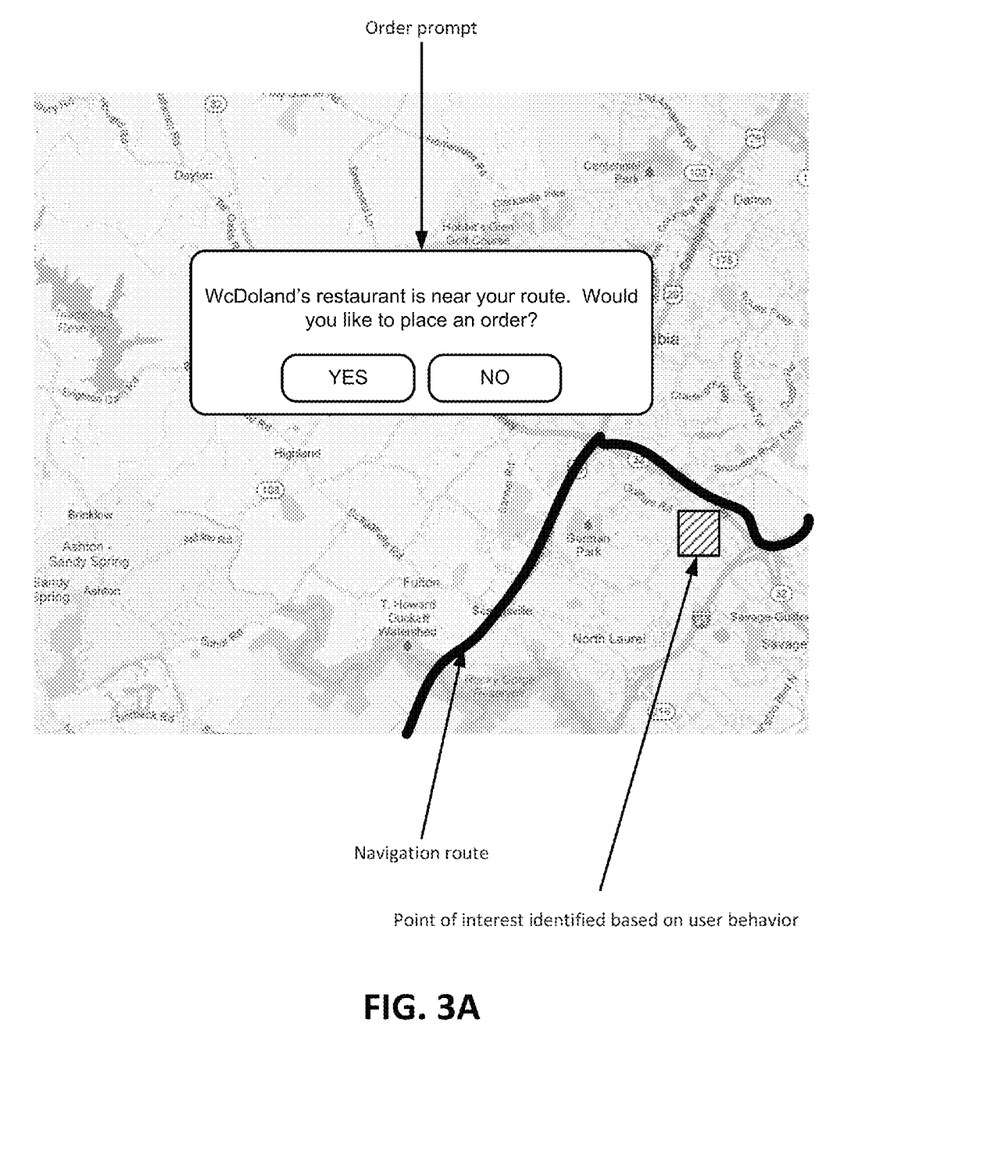
Figure 3B:
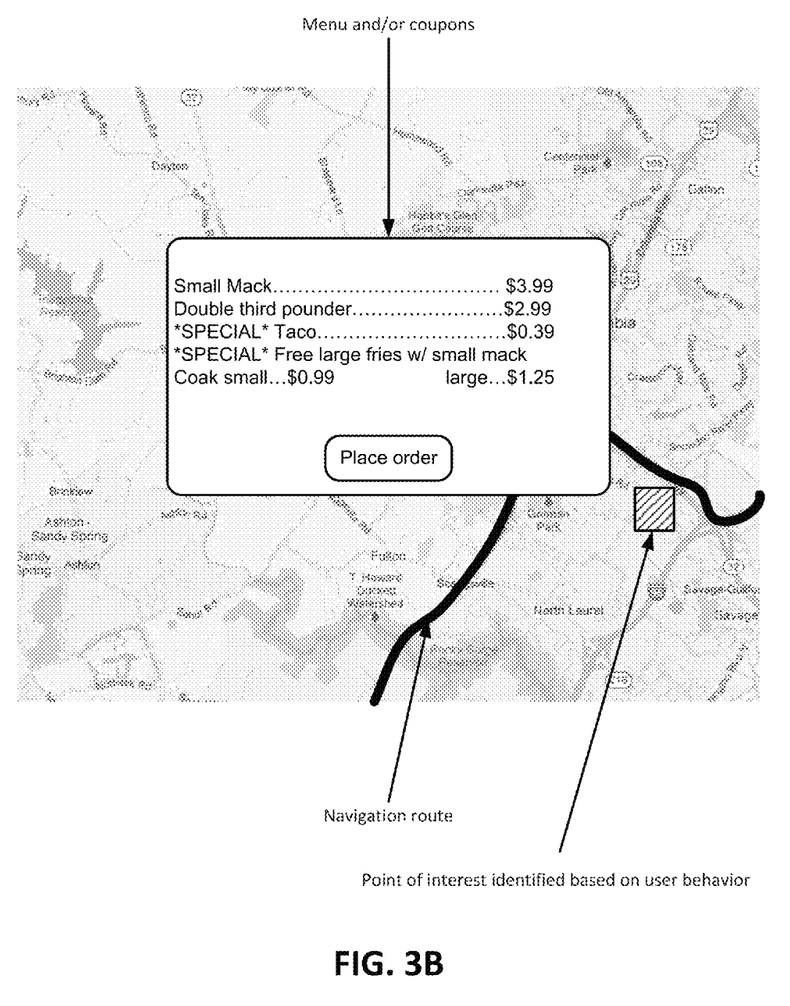

FIGS. 3A and 3B illustrate an example of presenting a pop-up notification to a user regarding a POI, which may have been determined to be relevant based on user behavior. For instance, as shown in FIG. 3A, a relevant POI may be near a navigation route selected by the user. Assume that the identified POI is a restaurant. As shown, a notification may be presented to the user, such as a prompt to place an order from the restaurant. As shown in FIG. 3B, assuming that the user has selected to place the order, a menu may be displayed, via which the user may place an order.

Figure 4:
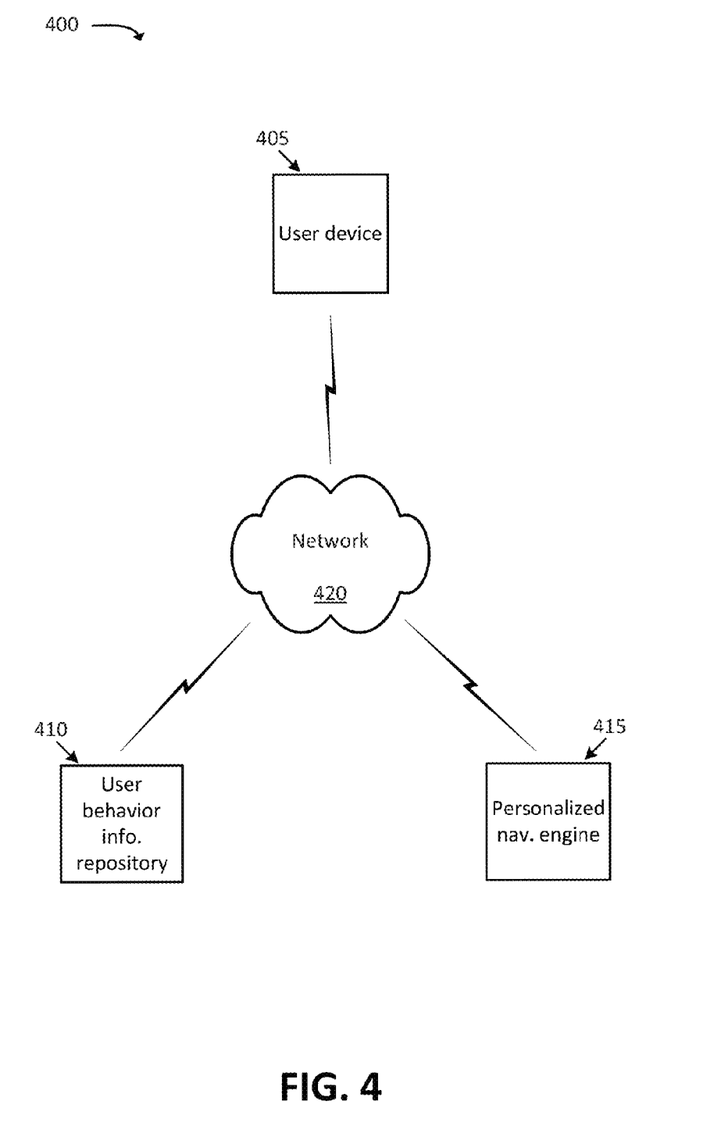
FIG. 4 illustrates an example environment in which systems and/or methods, described herein, may be implemented.

FIG. 4 illustrates an example environment 400, in which systems and/or methods, described herein, may be implemented. Environment 400 may include user device 405, puser behavior information repository 410, and personalized navigation engine 415 connected to network 420. One user device 405 and two servers 410 and 415 have been illustrated as connected to network 420 for simplicity. In practice, environment 400 may include additional user devices and/or servers, or fewer user devices and/or servers. Also, in some instances, user device 405 may perform a function of a server, or a server may perform a function of user device 405.

User device 405 may include a client device, such as a mobile telephone, a personal computer, a personal digital assistant ("PDA"), a tablet computer, a laptop, a navigation system (e.g., a navigation system integrated in, or otherwise associated with, an automobile) or any other type of computation or communication device. User device 405 may also include one or more components that may aid in determining a geographical location of user device 405. For example, user device 405 may include one or more global positioning system ("GPS") components. As another example, user device 405 may be in communication with a wireless telecommunications network (e.g., a cellular telecommunications network), which may provide location information (as determined by, for example, triangulation and/or another technique) to user device 405.

Servers 410 and 415 may each be implemented as a single server device or a collection of server devices that may be co-located or remotely located. Additionally, or alternatively, servers 410 and 415 may be implemented together within a single, common server device or a single, common collection of server devices.

Puser behavior information repository 410 may receive and/or store information regarding user behavior. The user behavior information may include information regarding, for example, locations visited by the user, businesses from which the user has purchased goods or services, a web browsing history associated with the user (e.g., Internet web sites that the user has accessed via a web browser), information from messages sent and/or received by the user (e.g., e-mails, text messages, etc.), and/or other information.

In some implementations, the user behavior information may be information that is collected based on a user opting in to data collection services (e.g., services that monitor a user's location, monitor a user's web browsing history, etc.). In some implementations, users may choose to opt out from such services at any time, to view and/or modify any associated user behavior information, and/or to have any or all associated user behavior information deleted.

In some implementations, the user behavior information may be received from a user. For example, the user may provide answers to a survey regarding user preferences (e.g., the user's favorite restaurants, stores, types of food, etc.). As another example, the user may provide ratings (e.g., thumbs up or thumbs down, a quantity of stars, a numerical value, etc.) for businesses, restaurants, etc. In some implementations, users may choose to view and/or modify any such user-supplied information, and/or to have any or all such user-supplied information deleted.

Personalized navigation engine 415 may perform user analytics based on user behavior information. For example, as described in further detail herein, personalized navigation engine 415 may receive user behavior information (e.g., from puser behavior information repository 410), and may output personalized navigation data. For example, personalized navigation engine 415 may store and/or output information regarding POIs that may be relevant to users.

Network 420 may include any type of network, such as a local area network ("LAN"), a wide area network ("WAN"), a telephone network—e.g., the Public Switched Telephone Network ("PSTN") or a cellular network—an intranet, the Internet, or a combination of networks. User device 405, puser behavior information repository 410, and/or personalized navigation engine 415 may connect to network 420 via wired and/or wireless connections. In other words, user device 405, puser behavior information repository 410, and/or personalized navigation engine 415 may connect to network 220 via a wired connection, a wireless connection, or a combination of a wired connection and a wireless connection.

Figure 5:
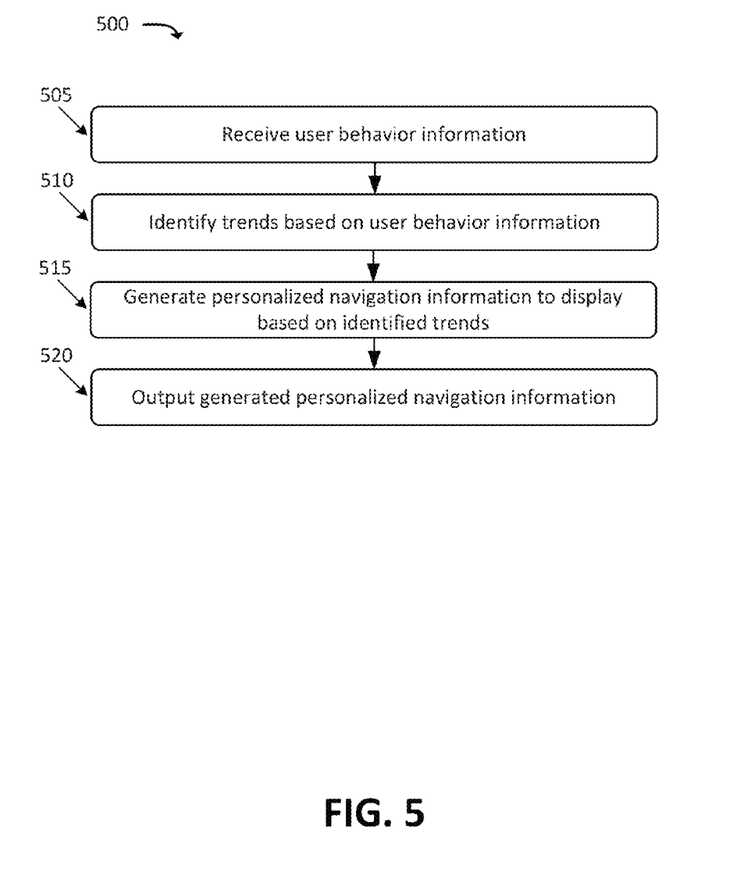
FIGS. 5-8 illustrate an example processes for generating and outputting personalized navigation information based on user behavior.

FIG. 5 illustrates an example process 500 for generating and outputting personalized navigation information. In one example implementation, process 500 may be performed by personalized navigation engine 415. In other implementations, some or all of process 500 may be performed by one or more other devices in lieu of, or in conjunction with, personalized navigation engine 415. For example, in some implementations, some or all of process 500 may be performed by user device 405.

Process 500 may include receiving user behavior information (block 505). For example, personalized navigation engine 415 may receive (e.g., from puser behavior information repository 410) user behavior information regarding a user, or a set of users. As mentioned above, the user may be a user who has opted in to data collection services, and/or has specifically provided information regarding the user. As also mentioned above, this user behavior information may identify geographical locations visited by the user, businesses from which the user has purchased goods and/or services, types of goods and/or services purchased by the user, web sites accessed by the user, web searches performed by the user, messages (e.g., message content, subject lines of messages, senders of messages, and/or recipients of messages) sent and/or received by the user, and/or other types of user behavior information.

The user behavior information may, in some implementations, include a temporal aspect. For example, the user behavior information (received at block 505) may indicate times of day and/or days of the week on which the user purchased a particular product. As described further below, such information may aid in generating personalized information for the user (e.g., personalized navigation engine 415 may determine or infer that the user buys coffee from a particular coffee shop on weekdays between 9:00 AM and 10:00 AM).

As mentioned above, the user behavior information may be collected by one or more data collection services. Such data collection services may receive information from, for example, a particular user device 405 associated with a user. For instance, user device 405 may periodically determine or receive information regarding a geographical location associated with user device 405, and may provide some or all of this information to a data collection service.

Some example data collection services may receive information from external sources, such as from a web server. For instance, an Internet web server that provides email services may provide information regarding a user who accesses the email services to a data collection service. As mentioned above, users may choose to opt out of such data collection services and/or to remove user information.

Some example data collection services may receive from third parties. For example, a credit card company, a bank, and/or a business may provide information regarding purchases made by users. As mentioned above, users may choose to opt out of such data collection services and/or to remove information regarding purchases made by users.

The user information (received at block 505) may, in some instances, include information provided by users. For example, the information may include information provided in response to a survey, which may prompt users for feedback regarding goods, services, businesses, web sites, user preferences, and/or other topics. In some implementations, the information may be based on blogs and/or social networking information associated with users. For example, the user information may indicate that a user has created a blog post that includes a hyperlink to a product. As described further below, such information may be used to identify locations that may be relevant to users.

Process 500 may further include identifying trends based on the user behavior information (block 510). These trends may correspond to user actions that tend to be repeated, and/or that may be able to be predicted, based on the user's previous behavior. For example, personalized navigation engine 415 may identify locations that may be relevant to the user. The locations may correspond to, for example, locations that have been frequently visited by the user (e.g., at least a threshold quantity of visits within a particular time period), businesses that have been frequently visited by the user, businesses at which the user has frequently purchased goods and/or services (e.g., at least a threshold quantity of purchases within a particular time period), businesses that offer a similar type of good and/or service that the user has purchased in the past and/or has expressed interest in, etc.

For instance, assume that the user has visited a particular fast food restaurant ten times in the past month. The user behavior information (received at block 505) may indicate, for example, that the user's geographic location matched a known geographical location associated with the fast food restaurant ten times in the past month. Additionally, or alternatively, personalized navigation engine 415 may receive and/or store information regarding geographical locations of businesses, and may compare geographical locations visited by the user to the information regarding the geographical locations of businesses in order to identify businesses that have been visited by the user.

As another example, assume that the user has provided feedback for restaurants, and has particularly indicated, by way of this feedback, that the user likes a particular fast food restaurant. For example, the user may have rated the particular fast food restaurant higher than other restaurants, the user may have submitted a rating that is above a threshold rating (e.g., greater than four stars out of five), the user may have responded to a survey in a manner that indicates a preference for the fast food restaurant, may have mentioned the restaurant in a blog post or a social networking site, etc. As described below, based on this feedback, personalized navigation engine 415 may determine that one or more geographical locations, that correspond to the fast food restaurant (e.g., one or more locations of the fast food restaurant), are relevant to the user.

As yet another example, assume that the user has sent or received messages (e.g., e-mails, text messages, etc.) that mention the particular fast food restaurant. As described below, based on these messages, personalized navigation engine 415 may determine that geographical locations, associated with the fast food restaurant, are relevant to the user.

As a further example, assume that the user behavior information (received at block 505) indicates that the user prefers fast food restaurants over other types of restaurants. For example, the user behavior information may indicate that the user has visited fast food restaurants at least a threshold quantity of times over a particular time period, that the user has visited fast food restaurants more often than other types of restaurants, that the user rates fast food restaurants more highly than other types of restaurants, etc. As described below, personalized navigation engine 415 may identify that geographical locations, associated with fast food restaurants, may be relevant to the user. For example, personalized navigation engine 415 may receive and/or store information associated with geographical locations of businesses, along with information identifying types of the businesses (e.g., may receive and/or store information identifying geographical locations of various fast food restaurants). Based on this information, personalized navigation engine 415 may determine that the geographical locations of these fast food restaurants may be relevant to the user.

Some examples of identifying trends were described above with respect to block 510. In practice, personalized navigation engine 415 may identify trends, associated with users, based on other types of user behavior information.

Process 500 may also include generating personalized navigation information to display based on the identified trends (block 515). For example, as mentioned above, personalized navigation engine 415 may identify POIs that may be relevant to the user. For instance, personalized navigation engine 415 may identify geographical locations that correspond to businesses and/or other landmarks in which the user may be interested. As discussed above, personalized navigation engine 415 may determine that these POIs may be relevant to the user based on user behavior information (received at block 505).

Process 500 may additionally include outputting the generated personalized navigation information (block 520). For example, personalized navigation engine 415 may output the generated personalized navigation information to a particular user device 405, associated with the user. Additionally, or alternatively, personalized navigation engine 415 may store the personalized navigation information, and/or may output the personalized navigation information to another device.

In conjunction with (e.g., prior to) outputting the generated personalized navigation information, personalized navigation engine 415 may determine how to display the generated personalized navigation information. For example, in some implementations, personalized navigation engine 415 may determine that the personalized navigation information should be displayed via POI icons overlaid on a map (e.g., as shown in FIGS. 1A and/or 1B). In some implementations, personalized navigation engine 415 may determine that the personalized navigation information should be displayed via an option to modify an existing navigation route (e.g., as shown in FIGS. 2A and 2B). In some implementations, personalized navigation engine 415 may determine that the personalized navigation information should be displayed via a pop-up notification that a particular POI is near an existing navigation route (e.g., as shown in FIG. 3A), and/or that a particular POI is near a user's present location. In some implementations, personalized navigation engine 415 may determine that a list of goods and/or services (e.g., an interactive menu), and/or coupons should be displayed (e.g., as shown in FIG. 3B). While some examples of how generated personalized navigation information may be outputted are described here, in practice, personalized navigation information may be outputted in different ways.

When determining how to display the personalized navigation information, personalized navigation engine 415 may make the determination based on user preferences. Personalized navigation engine 415 may receive information regarding user preferences from user device 405 and/or from another device (e.g., from a home subscriber service ("HSS") server associated with a cellular network, with which user device 405 may be associated). The user preferences may indicate, for example, how a user prefers personalized navigation information to be presented to the user. For instance, a particular user may indicate that the user does not desire for pop-up notifications to be presented to the user, while indicating that the user desires for navigation modification options to be presented to the user.

While process 500 was described above in the context of personalized navigation engine 415 performing the acts described with respect to blocks 505-520, user device 405 may perform one or more of these acts in lieu of, or in addition to, personalized navigation engine 415 performing these acts. For example, in some implementations, at block 510, when identifying trends based on user behavior information, personalized navigation engine 415 may identify geographical locations which may be relevant to the user. In some implementations, personalized navigation engine 415 may output information regarding these geographical locations to user device 405. In some such implementations, user device 405 may generate (at block 515) personalized navigation information based on these geographical locations (e.g., may identify businesses associated with these geographical locations, and/or may determine how to output this information), and may output (at block 520) the personalized navigation information via a display device associated with user device 405.

Figure 6:
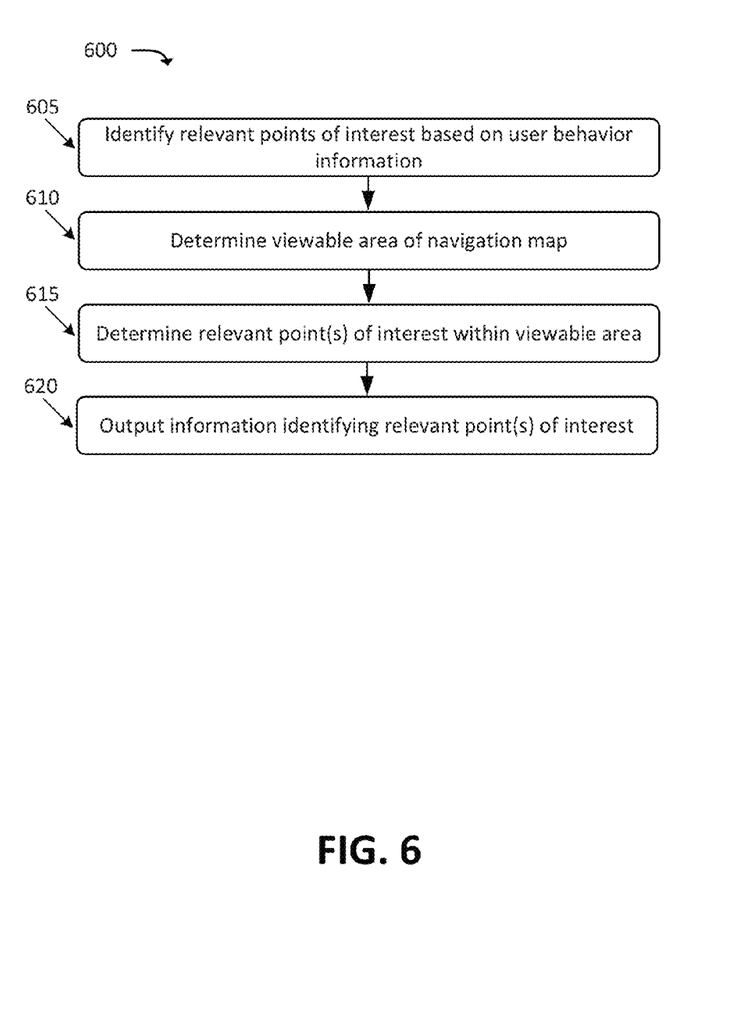

FIG. 6 illustrates an example process 600 for displaying information regarding relevant POIs based on user behavior information. In one example implementation, process 600 may be performed by user device 405. In other implementations, some or all of process 600 may be performed by one or more other devices in lieu of, or in conjunction with, user device 405. For example, in some implementations, some or all of process 600 may be performed by personalized navigation engine 415.

Process 600 may include identifying relevant POIs based on user behavior information (block 605). For example, user device 405 may receive information from personalized navigation engine 415, identifying POIs that may be relevant to a user associated with user device 405, and/or geographical locations that may be relevant to the user. Additionally, or alternatively, user device 405 may receive user behavior information (e.g., from puser behavior information repository 410 and/or from another source), and may determine relevant POIs based on the user behavior information (e.g., in a manner similar to that described above with respect to FIG. 5).

Process 600 may additionally include determining a viewable area of a navigation map associated with the user (block 610). For example, user device 405 may include, or be otherwise associated with, a display device which may output a geographical map. User device 405 may determine a viewable area of the map (e.g., may determine geographical coordinates that bound a viewable area of the map).

Process 600 may further include determining relevant POI(s) within the viewable area (block 620). For example, user device 405 may compare geographical locations of the relevant POIs (identified at 605) to the viewable area of the map (determined at block 610) to determine which of the relevant POIs are located within the viewable area of the map.

Process 600 may also include outputting information identifying the relevant POI(s). For example, user device may output the information identifying the relevant POIs by overlaying icons associated with the relevant POIs on the map (e.g., as shown in FIGS. 1A and/or 1B). As mentioned above, the icons may vary based on the type of POI. For example, a restaurant POI may be indicated by an icon that resembles a fork or a logo of the restaurant, a gas station POI may be indicated by an icon that resembles a gasoline pump or a logo of the gas station, a retail store POI may be indicated by an icon that resembles a dollar sign or a logo of the retail store, etc.

Figure 7:
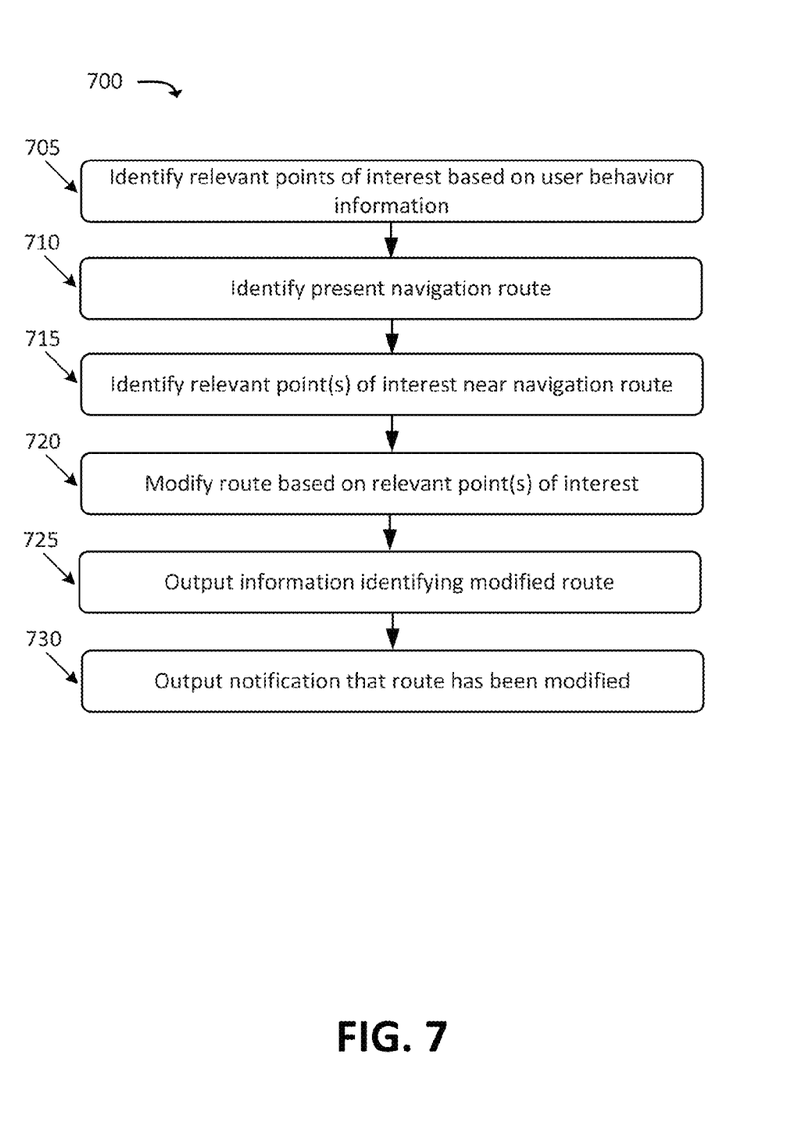

FIG. 7 illustrates an example process 700 for modifying a navigation route based on user behavior information. In one example implementation, process 700 may be performed by user device 405. In other implementations, some or all of process 700 may be performed by one or more other devices in lieu of, or in conjunction with, user device 405. For example, in some implementations, some or all of process 700 may be performed by personalized navigation engine 415.

Process 700 may include identifying relevant POIs based on user behavior information (block 705). For example, user device 405 may receive information from personalized navigation engine 415, identifying POIs that may be relevant to a user associated with user device 405, and/or geographical locations that may be relevant to the user. Additionally, or alternatively, user device 405 may receive user behavior information (e.g., from puser behavior information repository 410 and/or from another source), and may determine relevant POIs based on the user behavior information (e.g., in a manner similar to that described above with respect to FIG. 5).

Process 700 may also include identifying a present navigation route (block 710). For example, user device 405 may include, or otherwise be associated with, hardware and/or software that is configured to provide directions for a navigation route. For instance, user device 405 may receive information identifying a desired destination from a user, and may generate a navigation route from a starting point (such as the user's initial location) to the desired destination.

Process 700 may additionally include identifying relevant POI(s) near the navigation route (block 715). For example, user device 405 may compare geographical locations of relevant POIs (identified at block 705) to the route (identified at block 710) to identify POIs that are near (e.g., within a threshold distance of) the route. The threshold distance may be based on user preferences, and may be specified in terms of distance (e.g., within one mile of the route), estimate time (e.g., within an estimated ten minutes of the route), types of roads associated with the route and the POI (e.g., whether the user wishes to leave a highway in order to be routed to relevant POIs), etc. In some implementations, different POIs and/or different types of POIs may be associated with different preferences. For example, a user may specify that the user wishes to be re-routed to restaurants that are up to one mile away from a route, but that the user wishes to be re-routed to retail stores that are up to three miles away from the route.

Process 700 may further include modifying the route based on the relevant POI(s) (block 720). For example, user device 405 may modify the route to include the relevant POI(s) (identified at block 715) as intermediate destinations on the way to the desired destination (e.g., as shown in FIG. 2B). In some implementations, prior to modifying the route, user device 405 may present a prompt, requesting permission to modify the route (e.g., as shown in FIG. 2A).

Process 700 may also include outputting information identifying the modified route (block 725). For example, user device 405 may display the modified route (e.g., may replace a display associated with the original route with a display associated with the modified route, as shown in, for example, FIG. 2B).

Process 700 may additionally include outputting a notification that the route has been modified (block 730). For example, user device 405 may display text (e.g., as shown in FIG. 2B) indicating that the route was modified. As another example, user device 405 may display the modified route using a different color or line thickness than used for non-modified routes.

Figure 8:
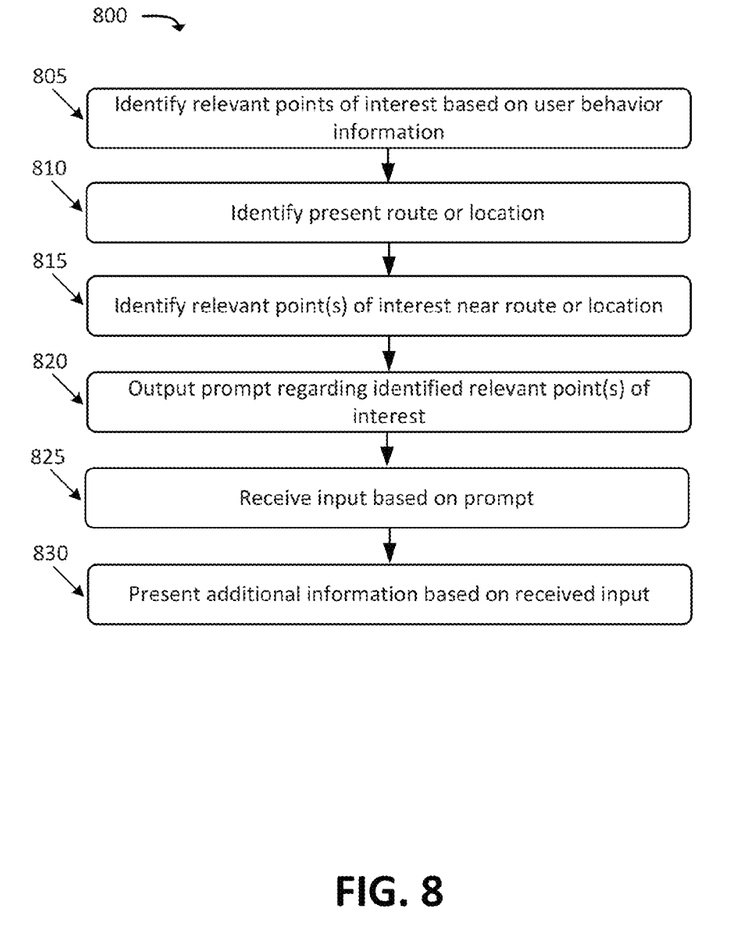

FIG. 8 illustrates an example process 800 for modifying a navigation route based on user behavior information. In one example implementation, process 800 may be performed by personalized navigation engine 415. In other implementations, some or all of process 800 may be performed by one or more other devices in lieu of, or in conjunction with, personalized navigation engine 415. For example, in some implementations, some or all of process 800 may be performed by user device 405.

Process 800 may include identifying relevant POIs based on user behavior information (block 805). For example, user device 405 may receive information from personalized navigation engine 415, identifying POIs that may be relevant to a user associated with user device 405, and/or geographical locations that may be relevant to the user. Additionally, or alternatively, user device 405 may receive user behavior information (e.g., from puser behavior information repository 410 and/or from another source), and may determine relevant POIs based on the user behavior information (e.g., in a manner similar to that described above with respect to FIG. 5).

Process 600 may also include identifying a present route or location of the user (block 810). For example, user device 405 may include hardware and/or software via which user device 405 may determine its own present geographical location (e.g., may include GPS capability). Additionally, or alternatively, user device 405 may receive information regarding its own geographical location from one or more other sources (e.g., from a wireless network, which may implement one or more location determination techniques, such as cellular triangulation). In some implementations, user device 405 may determine a navigation route associated with user device 405 (e.g., as determined based on a desired destination specified by the user).

Process 800 may also include identifying relevant POI(s) near the present route or the location of the user (block 815). For example, user device 405 may compare geographic locations of the POI(s) (identified at block 805) to the present route or location to identify POI(s) that are near the present route or location.

Process 800 may additionally include outputting a prompt regarding the identified relevant POI(s) (block 820). For example, user device 405 may output a prompt asking if the user would like to receive directions to a relevant POI. As another example, user device 405 may present a prompt asking if the user would like to view a listing of goods and/or services offered for sale at the POI (e.g., as shown in FIG. 3A).

In some implementations, when outputting the prompt, user device 405 may determine a priority of multiple POIs, and may output the prompt based on the POI with the highest priority. For example, assume that user device identifies two fast food restaurants as relevant POIs. The priorities of these fast food restaurants may be based on, for example, the preferences of the user (e.g., whether the user has indicated a favorite restaurant out of the two), sponsorship details (e.g., whether one or both of the restaurants have paid to have information displayed to users wen users are near the restaurants), distance of the restaurants from the user's route or location, etc.

Process 800 may further include receiving input based on the prompt (block 825). For example, user device 405 may receive input indicating that the user would like to view additional information regarding the POI (e.g., directions, a listing of goods and/or services, etc.).

Process 800 may also include presenting additional information based on the received input (block 830). For example, user device 405 may output additional information regarding the POI, via a display device associated with user device 405. For instance, user device 405 may display a route to the POI, a listing of goods and/or services, etc. (e.g., as shown in FIG. 3B).

Figure 9:
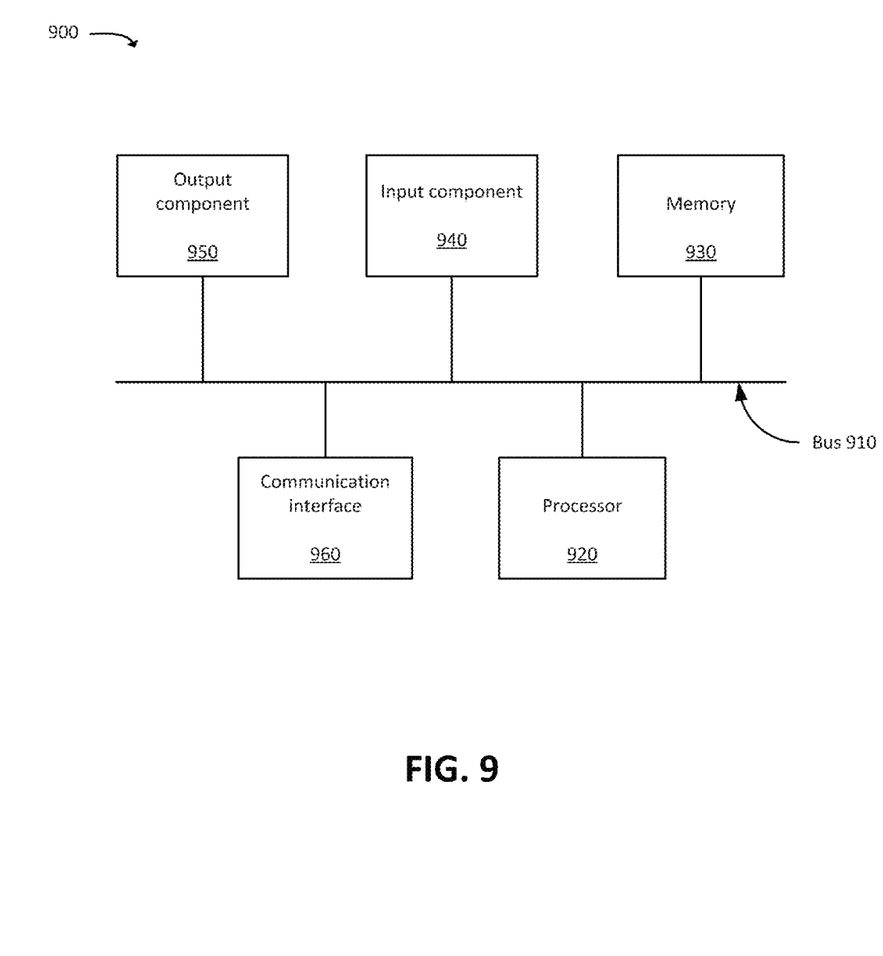
FIG. 9 illustrates example components of one or more devices shown in FIG. 4.

FIG. 9 is a diagram of example components of device 900. One or more of the devices illustrated in FIG. 4 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIGS. 5-8, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:
1. A method, comprising:
    receiving, by a user device, information regarding a set of points of interest that have been determined based on behavior information associated with a user of the user device,
        the behavior information including information identifying a particular type of product or service that the user purchases greater than a threshold quantity of times during a particular time period,
        the set of points of interest including businesses that offer the particular type of product or service for sale, wherein the information regarding the set of points of interest indicates geographical locations associated with one or more of the points of interest, of the set of points of interest;

determining, by the user device, a present geographical location associated with the user device;

comparing, by the user device, the geographical locations associated with the one or more points of interest to the present geographical location associated with the user device;

identifying, by the user device and based on the comparing, a particular point of interest, of the set of points of interest, that is within a particular distance of the present geographical location of the user device; and outputting, via a display device associated with the user device, information regarding the identified particular point of interest, wherein outputting the information, regarding the identified particular point of interest, includes:

presenting the information, regarding the identified particular point of interest, via a pop-up notification on the display device associated with the user device.

2. The method of claim 1, wherein determining the present geographical location associated with the user device includes:

determining the present geographical location using a global positioning system ("GPS") device associated with the user device.

3. The method of claim 1, wherein determining the present geographical location associated with the user device includes:

receiving information, that is based on a triangulation technique, regarding the geographical location from a device associated with a wireless telecommunications system.

4. The method of claim 1, wherein the particular distance is based on a user preference previously set by the user.

5. The method of claim 1, wherein outputting the information regarding the identified particular point of interest further includes:

modifying an original navigation route based on the particular point of interest, to generate a modified navigation route, and visually displaying the modified navigation route in lieu of displaying the original navigation route.

6. The method of claim 1, wherein outputting the information regarding the identified particular point of interest further includes:

visually displaying a listing of at least one of:
goods offered for sale by a business associated with the particular point of interest,
services offered for sale by the business, and
coupons associated with the goods or the services.

7. The method of claim 1, wherein the behavior information is based on at least one of:
geographical locations visited by the user, or
businesses from which the user has previously purchased goods or services.

8. The method of claim 1, wherein the behavior information is based on a web browsing history associated with the user.

9. A user device, comprising:
a memory device to store a set of computer-executable instructions; and
one or more processors to execute the computer-executable instructions, to:

receive information regarding a set of points of interest that have been determined based on behavior information associated with a user of the user device,
the behavior information including information identifying a particular type of product or service that the user purchases greater than a threshold quantity of times during a particular time period,
the set of points of interest including businesses that offer the particular type of product or service for sale,
wherein the information regarding the set of points of interest indicates geographical locations associated with one or more of the points of interest, of the set of points of interest;

determine a present geographical location associated with the user device;

compare the geographical locations associated with the one or more points of interest to the present geographical location associated with the user device;

identify, based on the comparing, a particular point of interest, of the set of points of interest, that is within a particular distance of the present geographical location of the user device; and output, via a display device associated with the user device, a pop-up notification that includes information regarding the identified particular point of interest.

10. The user device of claim 9, wherein when determining the present geographical location associated with the user device, the one or more processors are to:

determine the present geographical location using a global positioning system ("GPS") device associated with the user device.

11. The user device of claim 9, wherein when determining the present geographical location associated with the user device, the one or more processors are to:

receive information, that is based on a triangulation technique, regarding the geographical location from a device associated with a wireless telecommunications system.

12. The user device of claim 9, wherein the particular distance is based on a user preference previously set by the user.

13. The user device of claim 9, wherein when outputting the information regarding the identified particular point of interest, the one or more processors are to:

modify an original navigation route based on the particular point of interest, to generate a modified navigation route, and visually display the modified navigation route in lieu of displaying the original navigation route.

14. The user device of claim 9, wherein when outputting the information regarding the identified particular point of interest, the one or more processors are to:

visually display a listing of at least one of:
goods offered for sale by a business associated with the particular point of interest,
services offered for sale by the business, and
coupons associated with the goods or the services.

15. The user device of claim 9, wherein the behavior information is based on user history information that includes at least one of:
geographical locations visited by the user, or
businesses from which the user has purchased goods or services at a prior time.

16. The user device of claim 9, wherein the behavior information is based on a web browsing history associated with the user.

17. A method, comprising:
receiving, by a server device, information regarding behavior of a user associated with a user device;
determining, by the server device, one or more trends associated with the user, based on the received information regarding the behavior of the user, wherein determining the one or more trends includes:
identifying a particular type of product or service that the user purchases greater than a threshold quantity of times during a particular time period;
identifying, by the server device, one or more geographical locations, based on the determined one or more trends, wherein identifying the one or more geographical locations includes:
identifying a particular geographical location of a business that offers the particular type of product or service for sale,
wherein the one or more geographical locations correspond to one or more points of interest that are potentially relevant to the user; and
outputting, by the server device and to the user device, information regarding the identified set of geographical locations.

18. The method of claim 17, wherein determining the one or more trends further includes:
identifying a particular geographical location that the user visits greater than a threshold quantity of times during a particular time period.

19. The method of claim 17, wherein the information regarding the behavior of the user is further based on one or more of:
geographical locations visited by the user, or
purchase information associated with the user, the purchase information indicating businesses from which the user has purchased goods or services at a prior time.

20. The method of claim 17, further comprising:
receiving information regarding a present location of the user device,
wherein identifying the one or more geographical locations based includes identifying that the one or more geographical locations are within a threshold distance of the present location of the user device.

21. The method of claim 20, wherein the particular distance is based on a user preference previously set by the user.

22. The method of claim 17, wherein the user device presents the information, regarding the identified set of geographical locations, via a pop-up notification on a display device associated with the user device.

* * * * *